United States Patent
Chew et al.

(10) Patent No.: US 11,347,453 B2
(45) Date of Patent: May 31, 2022

(54) NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

(71) Applicant: Brother Kogyo Kabushiki Kaisha, Nagoya (JP)

(72) Inventors: Po Chun Chew, Nagoya (JP); Koshi Fukazawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/237,385

(22) Filed: Apr. 22, 2021

(65) Prior Publication Data

US 2021/0334047 A1 Oct. 28, 2021

(30) Foreign Application Priority Data

Apr. 28, 2020 (JP) .............................. JP2020-079125

(51) Int. Cl.
*G06F 15/00* (2006.01)
*G06F 3/12* (2006.01)
*G06K 1/00* (2006.01)

(52) U.S. Cl.
CPC ............ *G06F 3/123* (2013.01); *G06F 3/1203* (2013.01); *G06F 3/1225* (2013.01); *G06F 3/1236* (2013.01); *G06F 3/1292* (2013.01)

(58) Field of Classification Search
CPC ...... G06F 3/123; G06F 3/1203; G06F 3/1225; G06F 3/1236; G06F 3/1292

USPC ............................ 358/1.15, 1.14, 1.13, 1.1
See application file for complete search history.

(56) References Cited

U.S. PATENT DOCUMENTS

| 2015/0081845 A1* | 3/2015 | Arai ..................... G06F 3/1275 709/218 |
| 2020/0090015 A1* | 3/2020 | Fujimoto ........... H04N 1/32128 |
| 2021/0096795 A1* | 4/2021 | Chew .................... G06F 3/1204 |

FOREIGN PATENT DOCUMENTS

JP    2013-105361 A    5/2013

* cited by examiner

*Primary Examiner* — Douglas Q Tran
(74) *Attorney, Agent, or Firm* — Burr & Brown, PLLC (57) ABSTRACT

A non-transitory storage medium stores a plurality of instructions readable by a computer of an information processing apparatus. The plurality of instructions cause the information processing apparatus to execute first setup processing of allowing a particular port of a plurality of communication ports to be used by software used for communicating with a particular device through a communication interface. Before the first setup processing is executed, the plurality of instructions cause the information processing apparatus to execute determination processing of determining whether the first setup processing is executable for the particular port or not. When it is determined that the first setup processing is not executable for the particular port, the plurality of instructions causes the information processing apparatus to execute second setup processing of setting up the particular port as the communication port for which the first setup processing is executable.

13 Claims, 7 Drawing Sheets

BT DEVICE INFORMATION

DEVICE ID | ABC1234

BT ADDRESS | a0:66:10:96:08:49

⋮

BT SERVICE

*SPP | VALID

FIG.2B

| PRINT QUEUE | PRINT PORT | PRINTER DRIVER | PRINT SETTING |
|---|---|---|---|
| QUEUE A | PRINT PORT A | DRIVER A | SETTING A |
| QUEUE B | PRINT PORT B | DRIVER B | SETTING B |
|  |  |  |  |

NON-TRANSITORY STORAGE MEDIUM STORING PLURALITY OF INSTRUCTIONS READABLE BY COMPUTER OF INFORMATION PROCESSING APPARATUS AND INFORMATION PROCESSING APPARATUS

CROSS REFERENCE TO RELATED APPLICATION

The present application claims priority from Japanese Patent Application No. 2020-079125, which was filed on Apr. 28, 2020, the disclosure of which is herein incorporated by reference in its entirety.

BACKGROUND

A technical field disclosed in the specification relates to a technique of setting up software on an information processing apparatus.

There has been known a technique in which software necessary to communicate with a device is set up on an information processing apparatus to be connected to the device. For example, the conventional information processing apparatus has an installer for installing a printer driver on the information processing apparatus, which is a configuration in which setting information relating to a previously designated communication port is written in a registry as a database included in an operating system.

SUMMARY

For example, when setting up a device driver necessary to communicate with the device in the information processing apparatus, it is necessary to allocate the device to the communication port prepared in the operating system of the information processing apparatus, and further, execute processing for allowing the allocated communication port to be used by the device driver. However, there is a case in which some communication ports are not recognized by a setup program just after the device is allocated, and the setup program cannot execute the processing for allowing the communication port to be used by the device driver. In such case, the setup program cannot complete the setup, and this confuses a user. The conventional information processing apparatus does not disclose a method for solving the above problem.

An aspect of the disclosure relates to a technique for increasing capability of completing the setup when setting up software necessary to communicate with the device in the information processing apparatus.

In one aspect of the disclosure, a non-transitory storage medium stores a plurality of instructions readable by a computer of an information processing apparatus. The information processing apparatus comprises a communication interface. A plurality of communication ports for communicating with a plurality of devices respectively through the communication interface are set in an operating system of the information processing apparatus. The plurality of communication ports are capable of being associated with the plurality of devices respectively. When executed by the computer, the plurality of instructions cause the information processing apparatus to execute first setup processing of allowing a particular port of the plurality of communication ports to be used by software used for communicating with the particular device through the communication interface. The particular port is associated with the particular device of the plurality of devices. When executed by the computer, before the first setup processing is executed, the plurality of instructions cause the information processing apparatus to execute determination processing of determining whether the first setup processing is executable for the particular port or not, and when it is determined that the first setup processing is not executable for the particular port in the determination processing, execute second setup processing of setting up the particular port as the communication port for which the first setup processing is executable.

In another aspect of the disclosure, an information processing apparatus comprises a communication interface; and a computer. A plurality of communication ports for communicating with a plurality of devices respectively through the communication interface are set in an operating system of the information processing apparatus, and the plurality of communication ports are capable of being associated with the plurality of devices respectively The computer executes first setup processing of allowing a particular port of the plurality of communication ports to be used by software used for communicating with the particular device through the communication interface. The particular port is associated with the particular device of the plurality of devices. The computer executes, before the first setup processing is executed, determination processing of determining whether the first setup processing is executable for the particular port or not. When it is determined that the first setup processing is not executable for the particular port in the determination processing, the computer executes second setup processing of setting up the particular port as the communication port for which the first setup processing is executable.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Hereinafter, an embodiment embodying a program will be explained in detail with reference to the attached drawings.

The embodiment discloses the program executed in a personal computer (hereinafter referred to as "PC").

A PC 1 according to the embodiment is an apparatus connectable to a printer 2 as a device having a function of printing an image and capable of executing various application programs (hereinafter referred to as "applications") for allowing the printer 2 to execute functions of printing and the like. The PC 1 is an example of an information processing apparatus. For example, a smartphone or a tablet computer may be used instead of the PC 1.

The printer 2 is a device having at least the print function and a communication function. The printer 2 is an example of a particular device. The printer 2 according to the embodiment has an interface 21 (hereinafter referred to as "BT-IF") for executing communication by a communication protocol in, at least, Bluetooth (registered trademark, hereinafter referred to as "BT") as the communication function. The BT communication is a communication standard for 1-to-1 wireless connection.

A plurality of communication profiles are prepared in the BT communication, and it is necessary that devices communicating with each other conform to the same communication profile for executing proper communication. The printer 2 according to the embodiment conforms to at least SPP (an abbreviation of Serial Port Profile) as the communication profile of the BT communication, and the printer 2 may conform also to other communication profiles such as HCRP (an abbreviation of Hardcopy Cable Replacement Profile). The printer 2 may further have communication functions in communication modes other than the BT communication, for example, a communication function in a USB system.

Figure 1:
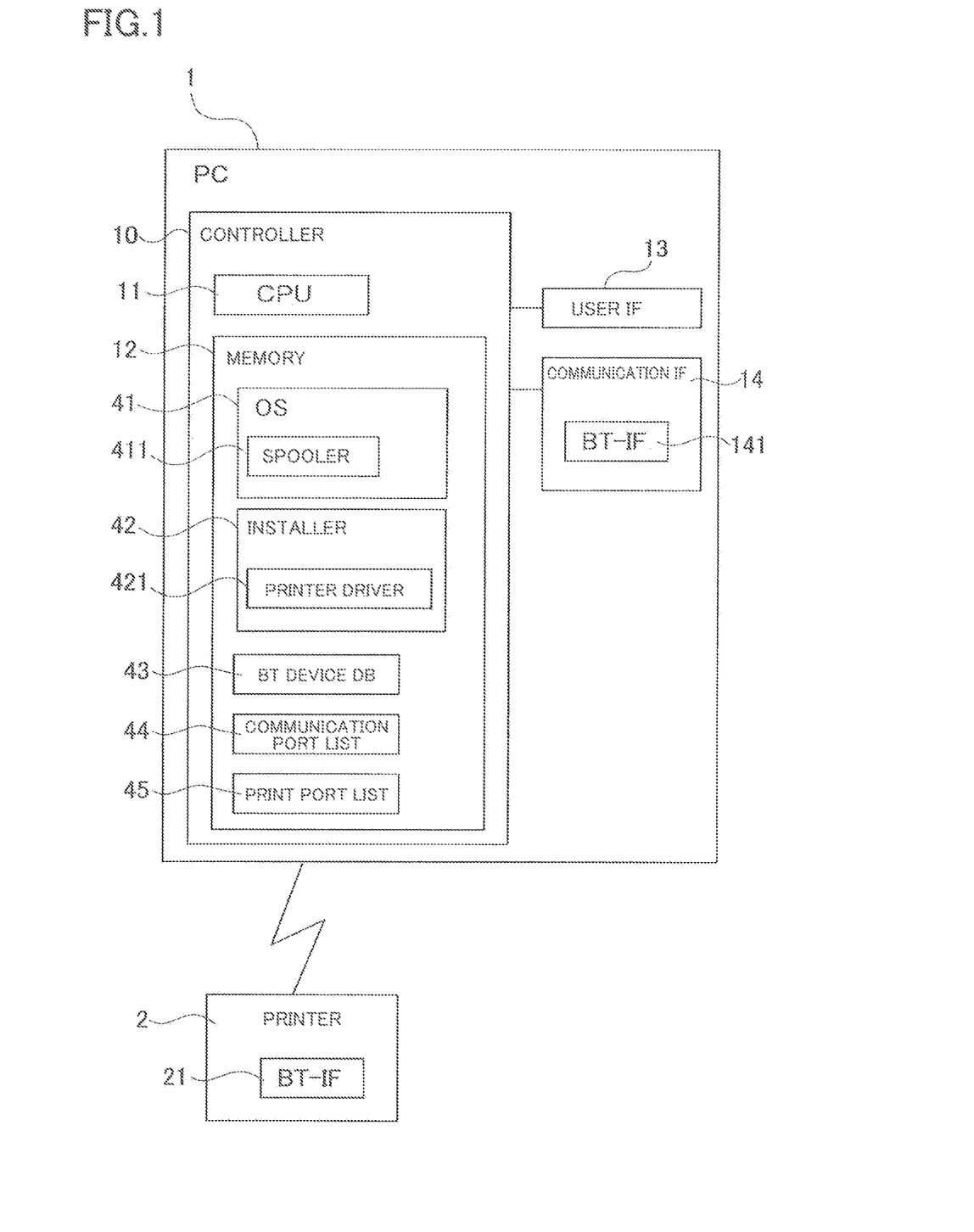
FIG. 1 is a schematic configuration diagram of a PC according to an embodiment.

The PC 1 according to the embodiment includes a controller 10 having a CPU 11 and a memory 12 as illustrated in FIG. 1. The CPU 11 is an example of a computer. The PC 1 also includes a user interface (hereinafter referred to as "user IF") 13 and a communication interface (hereinafter referred to as "communication IF") 14, and the user interface 13 and the communication interface 14 are electrically connected to the controller 10. The controller 10 in FIG. 1 is a general term used when hardware and software used for controlling the PC 1 or the like are collectively called, and the controller 10 does not always represent single hardware actually existing in the PC 1 or the like.

The CPU 11 executes various processing in accordance with programs read out from the memory 12 or based on operations by a user. The memory 12 is, for example, a ROM, a RAM, an HDD, or a flash memory, and the memory 12 is a storage area storing various programs such as a starting program for starting the PC 1, and various data such as image data, document data, and various setting information. The memory 12 is used also as a work area at the time of executing various processing. A buffer provided in the CPU 11 is also an example of the memory.

Examples of the memory 12 are not limited to the HDD and the like included in the PC 1 but may be storage media readable and writable by the CPU 11. The storage media readable by the computer are non-transitory media. The non-transitory media include recording media such as a CD-ROM and a DVD-ROM in addition to the above examples. The non-transitory media are also tangible media. On the other hand, an electrical signal configured to carry programs downloaded from a server or the like on Internet is a signal medium readable by the computer, and the signal medium is a kind of media readable by the computer; however, the signal medium is not included in the non-transitory storage media readable by the computer.

The user IF 13 includes hardware configured to display information on a screen and hardware configured to receive input operations by the user. The user IF 13 may be a combination of a display for executing display and a keyboard or a mouse, or may be a touch panel having a display function and an input receiving function.

The communication IF 14 includes hardware for communicating with external devices such as the printer 2 and the like. The PC 1 according to the embodiment includes at least a BT-IF 141 as the communication IF 14. The communication IF 14 may include IFs conforming to further other communication modes such as Ethernet (registered trademark), Wi-Fi (registered trademark), and USB. That is, the communication IF 14 may include IFs of wired system in addition to wireless systems.

In the memory 12 of the PC 1, an operating system (hereinafter referred to as "OS") 41, an installer 42, a BT device information database (hereinafter referred to as "BT device DB") 43, a communication port list 44, and a print port list 45 are incorporated as illustrated in FIG. 1. The OS 41 is, for example, Windows (registered trademark), mac OS (registered trademark), iOS (registered trademark), Android (registered trademark), or Linux (registered trademark). A spooler 411 is included in the OS 41. The spooler 411 manages transmission of print data to the device having the print function such as the printer 2.

The installer 42 includes a printer driver 421 applicable to a model of the printer 2, and the installer 42 is a program for incorporating the printer driver 421 in the PC 1. The installer 42 is an example of a plurality of instructions. FIG. 1 is a diagram illustrating a state before the setup of the printer 2 is completed. The printer driver 421 is incorporated in the memory 12 after the setup is completed. The installer 42 may be deleted after the setup is completed.

The printer driver 421 generates, for example, print data for making the printer 2 execute printing in cooperation with the OS 41. The printer driver 421 is an example of a device driver, and an example of software. The installer 42 may include not only the printer driver 421 for the model of the printer 2 but also a printer driver or a scanner driver for another model.

Figure 2A:
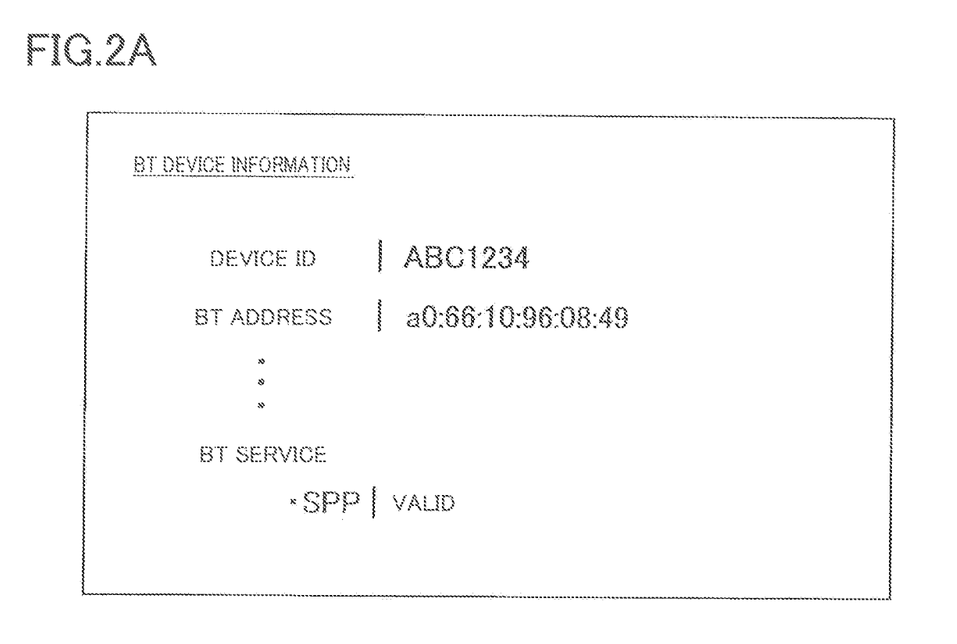
FIG. 2A is a view illustrating an example of device information stored in a BT device DB.

The BT device DB 43 stores device information of respective BT devices registered in the OS 41 as available devices using the BT communication. In the BT device DB 43, for example, information including a device ID as information for identifying the device and a BT address as address information used for the BT communication is stored as device information as illustrated in FIG. 2A.

The communication port list 44 is a list in which a plurality of communication ports used by the PC 1 for communicating with an external device by using the communication IF 14 are set. The print port list 45 is a list of communication ports used in the spooler 411 for allowing the printer 2 or the like to execute printing. The print port list 45 is an example of a first list and the communication port list 44 is an example of a second list.

Figure 2B:
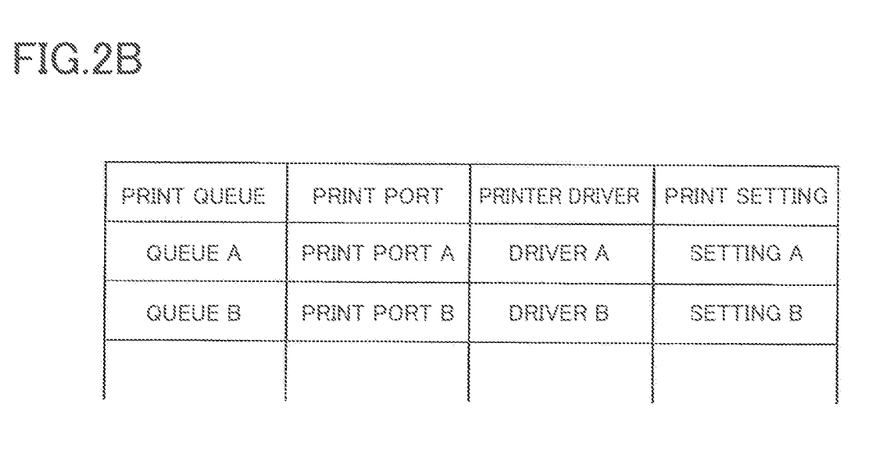
FIG. 2B is an explanatory chart illustrating an example of information stored in a print queue.

The device registered in the BT device DB 43 is associated with the communication port by the communication port list 44. The communication port with which the device is associated is registered also in the print port list 45. When the communication port is associated with a print queue, the application installed in the PC 1 is able to instruct printing by designating the print queue. For example, information such as a print port, the printer driver, print setting, and the like is stored so as to be associated with the print queue as illustrated in FIG. 2B. The printer driver associated with the print queue instructed for printing allows the device associated with the communication port to execute printing through the communication port associated with the print queue.

Specifically, the application instructs the OS 41 to execute printing by designating the print queue and passing image data to the OS 41. The OS 41 instructed for executing print starts the printer driver 421 associated with the print queue and passes the image data to be printed to the printer driver 421. The printer driver 421 generates print data corresponding to the printer 2 based on the image data received from the OS 41 and passes the generated print data to the OS 41. The OS 41 passes the received print data to the print queue. The spooler 411 transmits the print data to the printer 2 through the print port corresponding to the print queue, namely, through the communication IF with which the print port is associated. Accordingly, printed matter obtained based on the image data is created by the printer 2. The details of the DB and respective lists will be explained later.

The information of the DB such as the BT device DB 43 and respective lists is stored in a non-transitory memory such as the HDD. The installer 42 uses the information by reading the information to the RAM from the HDD or the like when using the information. In the following description, registration to the DB and the lists by the OS 41 and the installer 42 means an update of information of the HDD and the like. The updated information is referred to by the OS 41, the spooler 411, and various applications.

Next, an outline of a procedure of installing the printer driver 421 by the installer 42 according to the embodiment and executing setup for instructing the printer 2 to execute printing by the printer driver 421 will be explained with reference to a sequence diagram of FIG. 3. The installer 42 allows the user to select a model name of the printer 2 and a type of the communication IF used for connection between the printer 2 and the PC 1 (A1). The installer 42 installs the printer driver 421 conforming to the selected model name in the PC 1 (A2). Explanation will be made on the assumption that the BT-IF has been selected in the following description.

The installer 42 instructs the user, for example, to make both of the BT-IF 141 of the PC 1 and the BT-IF 21 of the printer 2 function and make both of the BT-IF 141 and the BT-IF 21 close to each other to a distance in which BT communication can be executed, and instructs the OS 41 to add the device (A3).

The OS 41 detects the device by using the BT-IF 141 when receiving the instruction for adding the device (A4). The OS 41 allows the BT-IF 141, for example, to transmit a search signal. Each device existing within a distance range in which BT communication can be executed with respect to the PC 1 and receiving the search signal sends information including the device ID as information for identifying the device and the BT address as address information used for the BT communication to the OS 41 in response to receipt of the search signal (A5). The OS 41 causes the user IF 13 to display a device selection screen including a list of additional candidate devices which have responded to the instruction (A6) and determines the device to be added based on selection by the user (A7). The OS 41 may detect the device by detecting beacons emitted from respective devices.

The OS 41 further communicates with the printer 2 when determining the printer 2 as the device to be added and obtains information of a communication profile to which the printer 2 can conform to complete pairing (A8). The OS 41 registers the printer 2 in which the pairing is completed in the communication port list 44 (A9).

The installer 42 obtains port names of respective communication ports registered in the communication port list 44 when the processing of pairing is completed by the OS 41 (A10), and displays them in a list (A11). The installer 42 receives selection of the communication port through the user IF 13 (A12). The installer 42 determines that the processing of pairing has been completed, for example, when the device selection screen displayed by the OS 41 is closed.

The installer 42 further instructs the OS 41 to create the print queue corresponding to the printer so as to be associated with the selected communication port and to register the printer driver 421 so as to be associated with the created print queue (A13). The print queue is an example of a device queue. The OS 41 creates the print queue corresponding to the selected communication port based on the instruction, and registers the printer driver 421 so as to be associated with the created print queue (A14).

Figure 4A:
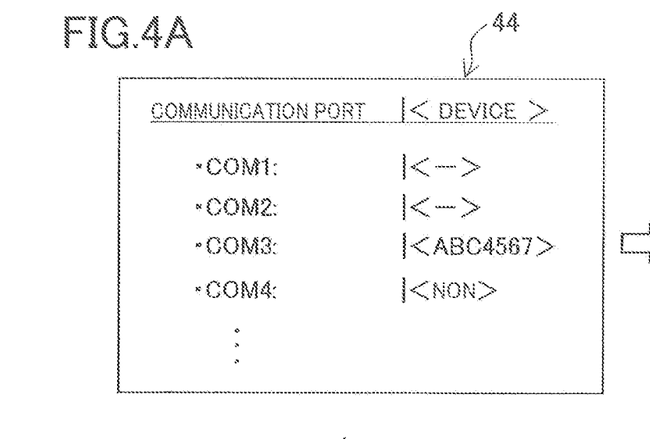
FIG. 4A is an explanatory view illustrating an example of configurations of communication ports.

In the OS 41 according to the embodiment, a plurality of COM ports are prepared in advance, for example, as illustrated in FIG. 4A, and port names are registered in the communication port list 44 such as a COM1 port and a COM2 port. For example, four ports which are the COM1 port, the COM2 port a COM3 port and a COM4 port are registered in the example of FIG. 4A. Among them, the COM1 port and the COM2 port are reserved by the OS 41 to be used by the OS 41. The OS 41 reserves these ports for communicating with a device mounted on a serial IF or a USB-IF. On the other hand, the COM3 port and the COM4 port are not reserved by the OS 41, and the COM3 port and the COM4 port are not associated with any device in an initial state of the PC 1.

The OS 41, when executing the pairing with the BT device, associates the device with one of the ports which are neither reserved nor associated. For example, a device "ABC4567" is registered while being associated with the COM3 port and any device is not associated with the COM4 port in a state of FIG. 4A. When pairing with another device "ABC5678" is executed in this state, the added device is registered while being associated with the COM4 port as illustrated n FIG. 4C.

When pairing of a new device is further instructed in a state in which there is no COM port which is neither reserved nor associated, the OS 41 additionally creates a new COM port and registers a designated device so as to be associated with the added COM port. For example, when the addition of the printer 2 as the device "ABC1234" is instructed in the state of FIG. 4C, the OS 41 registers a COM5 port in the communication port list 44 and registers the printer 2 so as to be associated with the COM5 port as illustrated in FIG. 4D. The COM5 port added by the OS 41 is an example of an additional port.

The installer 42 obtains the list of communication port names from the communication port list 44 and displays the list (A10 to A11 of FIG. 3), therefore, the communication port just after being added by the OS 41 can be selected. Accordingly, a possibility that the user confuses about a failure of pairing with the printer 2 is decreased.

Figure 4B:
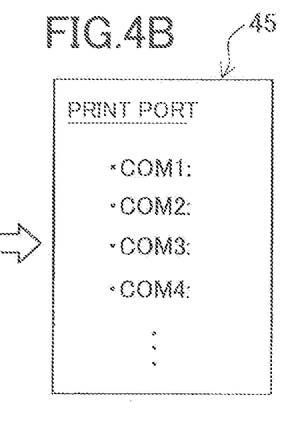
FIG. 4B is an explanatory view illustrating an example of configurations of print ports.
Figure 4C:
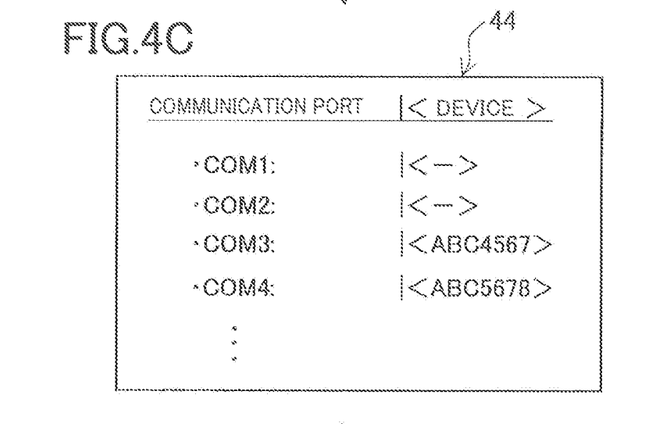
FIG. 4C is an explanatory view illustrating an example of configurations of the communication ports.
Figure 4D:
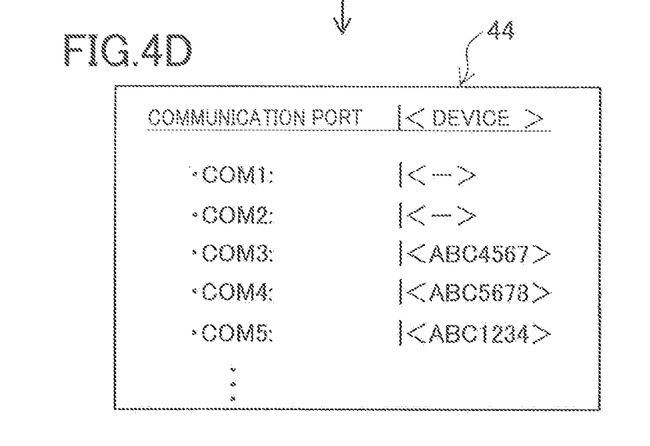
FIG. 4D is an explanatory view illustrating an example of configurations of the communication ports.

On the other hand, the spooler 411 associates print ports having the same names as respective communication ports in the communication port list 44 with devices by using the print port list 45, for example, as illustrated in FIG. 4B. However, the communication port just after added by the OS 41 is not included in the print port list 45, and the spooler 411 is not capable of recognizing the added communication port as the print port.

When the OS 41 creates the print queue so as to be associated with the print port registered in the print port list 45, the installer 42 is not capable of designating the print port corresponding to the newly added communication port, therefore, it is difficult to instruct the OS 41 to create the print queue. The added COM port is an example of a communication port for which the print queue is not capable of being created. On the other hand, the print port registered in the print port list 45 is an example of a communication port for which the print queue is capable of being created. Even when the installer 42 instructs creation of the print queue by designating the new communication port and the application instructs printing by selecting the created print queue, the spooler 411 is not capable of transmitting print data to the printer 2, since the communication port designated by the print queue is not included in the print port list 45.

The PC 1 according to the embodiment uses the OS 41 including the print port list 45 containing ports with the same names as ports in the communication port list 44 and creating the print queue based on the print port list 45. The OS 41 does not add the added communication port to the print port list 45 when the communication port is added to the port list 44. The installer 42 according to the embodiment completes the setup so as to allow the printer 2 to execute printing even in the case where the printer 2 is registered with respect to the communication port in the port list 44 added by the OS 41.

Each of the print ports is preferably associated with a corresponding one of the communication ports, and correspondence therebetween is not always based on names of the ports. For example, when an identification number is given to each of the communication ports, each of the print ports may be associated with based on the identification number. In a case where each of the print ports is associated with based on names, the name of each of the ports is an example of identification information of the communication port.

Next, a procedure of setup processing by the installer 42 will be explained with reference to a flowchart. The following processing and respective processing steps of the flowchart basically indicate processing of the CPU 11 following commands described in programs. That is, processing such as "to decide", "to extract", "to select", "to calculate", "to determine", "to specify", "to obtain", "to receive", and "to control" in the following explanation indicates processing of the CPU 11. The processing by the CPU 11 also includes hardware control using an API of the OS 41 in the PC 1. In the specification, the description of the OS is omitted and operations of respective programs will be explained. That is, a description saying that "a program B controls hardware C" may indicate that "the program B controls hardware C by using the API of the OS" in the following explanation. Moreover, processing of the CPU 11 following commands described in the program is described in simplified wording in some cases. For example, the description will be made such as "the CPU 11 executes . . . ". Furthermore, processing of the CPU 11 following commands described in the program is described in wording in which the CPU is omitted such as "the program A executes . . . " in some cases.

Note that "to obtain" will be used in a concept that the request is not essential. That is, processing of receiving data without being requested by the CPU 11 is also included in a concept that "the CPU 11 obtains data". "Data" in the specification is represented by a bit string readable by the computer. Then, data having substantially the same contents in a different format will be dealt with as the identical data. The same applies to "information" in the specification.

Moreover, "to request" and "to instruct" are concepts that information indicating the request and information indicating the instruction are outputted to the other party. The information indicating the request and the information indicating instruction may be written merely as "request" and "instruction".

Furthermore, processing of determining whether information A indicates that it is a matter B by the CPU 11 may be conceptually described such as "whether it is the matter B or not is determined from the information A". Processing of determining whether information A indicates that it is a matter B or a matter C may be conceptually described such as "whether it is the matter B or the matter C is determined from the information A".

Hereinafter, a procedure of setup processing according to a first embodiment will be explained with reference to a flowchart of FIG. 5. The setup processing is executed in the CPU 11 of the PC 1 when the installer 42 is started up in the PC 1.

Figure 3:
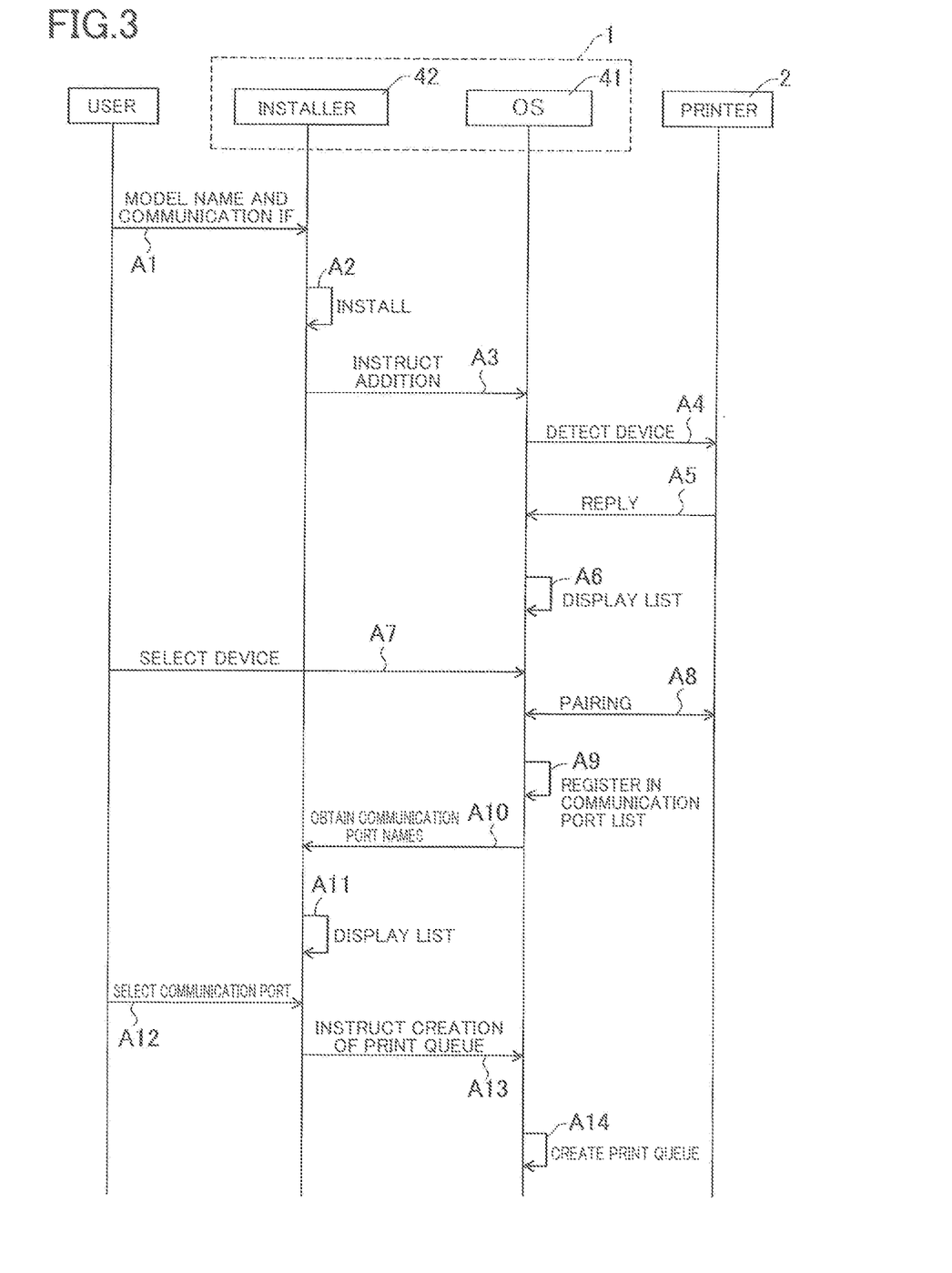
FIG. 3 is a sequence diagram illustrating an outline of an installer procedure.

In the setup processing, the CPU 11 receives designation of model information of the device to be set up and the communication mode by a user's operation (S101, A1 of FIG. 3). S101 is an example of selection processing. When the printer 2 conforms to not only the BT communication but also communication in other communication modes such as USB communication, the user can select a communication mode used for communicating with the printer 2 from these communication modes. The case in which designation of model information conforming to the model of the printer 2 and designation of the BT communication are received at S101 will be explained in the following description.

The CPU 11 determines the printer driver 421 to be installed based on information designated at S101 and installs the printer driver 421 (S102, A2 of FIG. 3). The installer 42 includes, for example, the printer drivers respectively conforming to a plurality of models in the same series, and printer drivers respectively conforming to a plurality of types of communication modes, and the installer 42 determines the printer driver to be installed from the plurality of printer drivers. In a case where only one type of printer driver is included in the installer 42, S101 may be skipped. If the printer driver 421 to be installed has been installed in the PC 1, the CPU 11 may skip S102.

In order to allow the printer 2 to execute printing, it is necessary to execute setting relating to the BT communication with the printer 2 after installation in which the printer driver 421 is incorporated in the memory 12 is executed. Accordingly, the CPU 11 instructs the OS 41 to add the device (S103, A3 of FIG. 3). S103 is an example of adding processing. The OS 41 displays, for example, a list of devices (A6 of FIG. 3) based on the search result (A4 and A5 of FIG. 3), the OS 41 receives selection by the user (A7 of FIG. 3), and the OS 41 executes pairing with the printer 2 (A8 of FIG. 3). The OS 41 obtains information of the conformable communication profile from the printer 2, the OS 41 sets the communication port with respect to the communication profile, and the OS 41 registers the communication port in the communication port list 44.

Since the printer 2 according to the embodiment conforms to SPP, information of SPP is obtained as the communication profile, and the OS 41 sets the SPP to be valid. In the case where the printer 2 conforms further to another communication profile, the OS 41 obtains information of another communication profile and sets the communication profile to be valid. The device information of the printer 2 is registered in the BT device DB 43 by the pairing, for example, as illustrated in FIG. 2A. Note that "BT service" in FIG. 2A indicates information of the valid communication profile.

The OS 41 allocates the communication ports used for communicating with the device for respective valid communication profiles by the pairing. The OS 41 sets SPP to be valid as the communication profile of the printer 2 in the embodiment, therefore, the OS 41 allocates one of COM ports which are communication ports used in SPP for the communication port used for communicating with the printer 2. The OS 41 registers the device ID and the BT address of the printer 2 in the communication port list 44 so as to be associated with the allocated communication port.

The CPU 11 obtains identification information of the COM port registered for the printer 2, for example, the name of the communication port (S104). The COM port for the printer 2 is an example of a particular port. The CPU 11 obtains the communication port list 44 from the OS 41 before and after the execution of pairing and compares names of the communication ports between the communication port lists 44 before and after the pairing to thereby obtain information of S104. When the OS 41 has a function of passing the name of the communication port associated with the added printer 2, the CPU 11 may obtain the name of the communication port associated with the added printer 2 from the OS 41 by using the function.

The CPU 11 receives designation of the communication profile to be used by a user's operation (S105). In the printer 2 capable of using both SPP and HCRP, the user can select which one is used. The CPU 11 may also receive designation of the communication profile at S101. The case where the SPP has been selected will be explained in the following description. The installer 42 of the model applicable only to SPP is not required to receive the user's operation at S105, and the CPU 11 can determine to use SPP.

The CPU 11 receives selection of the communication port to be used in the printer as a target of the installed printer driver 421 (S106, A12 of FIG. 3). The CPU 11 causes the user IF 13 to display the list of selectable communication ports (A11 of FIG. 3) and receives selection by the user. The CPU 11 may preferably display the communication port in which the device is newly registered by the pairing this time in display states such as displaying at the top, displaying with emphasis, and displaying only the communication port so that the communication port is easily selected by the user. Then, the COM port registered for the printer 2, that is, the communication port having the name obtained at S104 is selected. In a case where another printer corresponding to the printer driver 421 is connected to the PC 1 in addition to the printer 2, the user may select the communication port for another printer at S106.

The CPU 11 obtains information of the print port, namely, the print port list 45 from the OS 41 (S107). S107 is an example of obtaining processing and information of the print port is an example of port information. The print port is an example of the communication port for which creation of the print queue and registration of the printer driver 421 can be instructed, and the print port is the communication port for which first setup processing is executable. The print port is the communication port recognizable by the spooler 411 and the print port list 45 is a list of print ports.

Then, the CPU 11 determines whether the print port having the same name as the communication port selected at S106, namely the COM port for the printer 2, is included in the print port list 45 obtained at S107 or not (S110). S110 is an example of determination processing. When the printer 2 is registered in one of the COM ports previously prepared by the OS 41, the print port having the same name as the one of the COM ports is included in the print port list 45. On the other hand, when the new COM port is added by the pairing with the printer 2, and the printer 2 is registered with respect to the added COM port, the print port having the same name as the added COM port is not included in the print port list 45.

When it is determined that the print port having the same name as the selected communication port is included in the print port list 45 (S110: YES), the CPU 11 designates the print port and passes an instruction for creating the print queue and an instruction for registering the installed printer driver 421 so as to be associated with the created print queue to the OS 41 (A111, A13 of FIG. 3), then, ends the setup processing. S111 is an example of first setup processing. Accordingly, as the OS 41 creates the print queue (A14 of FIG. 3) as described above; the printer 2 is allowed to execute printing.

Figure 6:
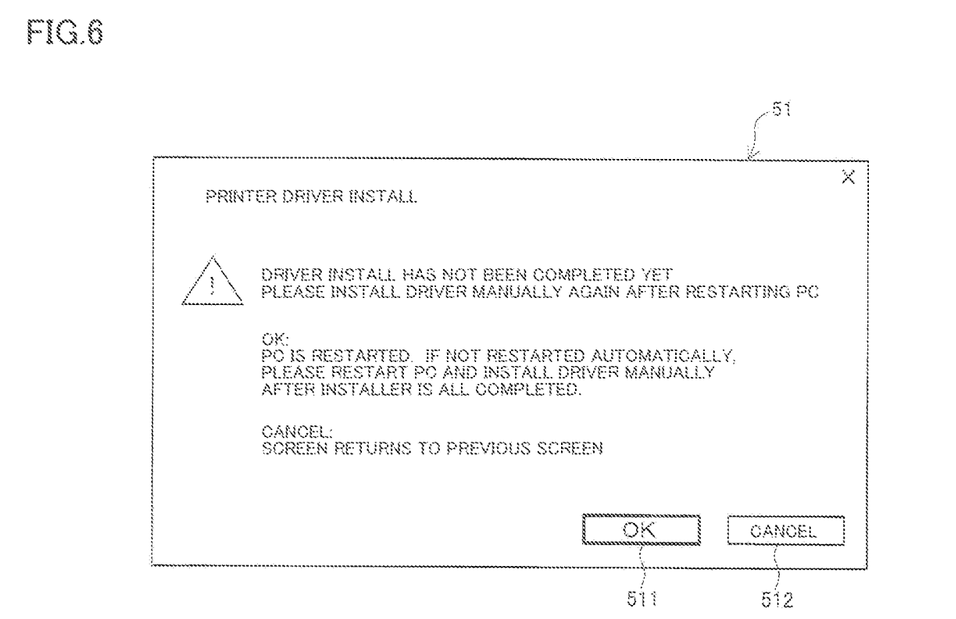
FIG. 6 is an explanatory view illustrating an example of a restart message.

On the other hand, when it is determined that the print port having the same name as the selected communication port is not included in the print port list 45 (S110: NO), the CPU 11 causes the user IF 13 to display a restart message for prompting restart of the PC 1 (S121). S121 is an example of second setup processing. The restart message is, for example, a message 51 notifying that the installed printer driver 421 is not applied unless the PC 1 is restarted and prompting execution of the installer 42 again after the restart as illustrated in FIG. 6. The message 51 includes, for example, an OK button 511 and a cancel button 512, and the CPU 11 receives an input operation by the user at S121. The notification manner may be an audio guidance in addition to the message display.

The print port is managed by the OS 41 and the spooler 411. For example, in a case where there is a communication port not included in the print port list 45 when checking the communication port list 44 at the time of starting the PC, the spooler 411 has a function of creating a print port with the same name as the communication port not included in the print port list 45 at the time of starting the PC and adding the print port to the print port list 45. Moreover, the spooler 411 is automatically restarted when the OS 41 is restarted. That is, when the OS 41 is restarted, the print port corresponding to the added communication port is added to the print port list 45 by the spooler 411.

Then, the CPU 11 determines whether an operation to the OK button 511 has been received or not (S122). When it is determined that the operation to the OK button 51 has been received (S122: YES), the CPU 11 restarts the OS 41 (S123), and ends the setup processing. On the other hand, when it is determined that an operation to the cancel button 512 has been received (S122: NO), the CPU 11 returns to the S106 and receives the selection of the port again. The user unwilling to execute the restart can select a procedure in which the installer 42 is not ended by operating the cancel button 512.

The installer 42 may be configured to restart the OS 41 constantly after the install is completed. For example, when installing a new version of the printer driver 421 which has been already installed, the installer 42 prompts the user to restart the OS 41 regardless of the determination result at S110. This is because there is a case where the spooler 411 locks a file used by the printer driver 421, and the installer 42 can replace the file by temporarily stopping the spooler 411 by restarting the OS 41. On the other hand, when there is no printer driver 421 which has been installed, the installer 42 is not required to restart the OS 41 as long as the communication port selected at S106 is not the added communication port.

It is also preferable that the installer 42 merely displays the message indicating that the restart is necessary, and then the restart may not be executed. In this case, the installer 42 returns to a previous display screen or ends the setup processing after the display screen of the message is closed by the user's operation.

In a case where the print queue already exists other than the print queue to be newly created this time, the spooler 411 may be in the middle of execution of some processing, for example, in the middle of execution of printing at another printer at the time of execution of the installer 42. When the restart of the OS 41 is executed thoughtlessly in that case, a print job in the middle of execution may be stopped or the restart may take a long time. In the embodiment, the restart is not executed always but executed only when necessary, thereby increasing user friendliness.

The notification preferably includes information indicating necessity of restarting the installer 42 after the restart of the OS 41, for example, as illustrated in FIG. 6. Then, the installer 42 may be configured to be able to store information indicating that the OS 41 has been restarted in the memory 12 and omit a selection operation by the user such as a selection of a connection mode as long as the information is stored at the time of starting the installer 42. Specifically, when the operation of the OK button 511 is received, the CPU 11 stores information of the communication port selected at S106 in a storage area usable by the installer 42 before passing the instruction for the restart to the OS 41. When the information of the communication port selected at S106 is stored in the storage area at the time of staring the setup processing, S101 to S106 may be skipped and processing may be executed from S107.

Figure 5:
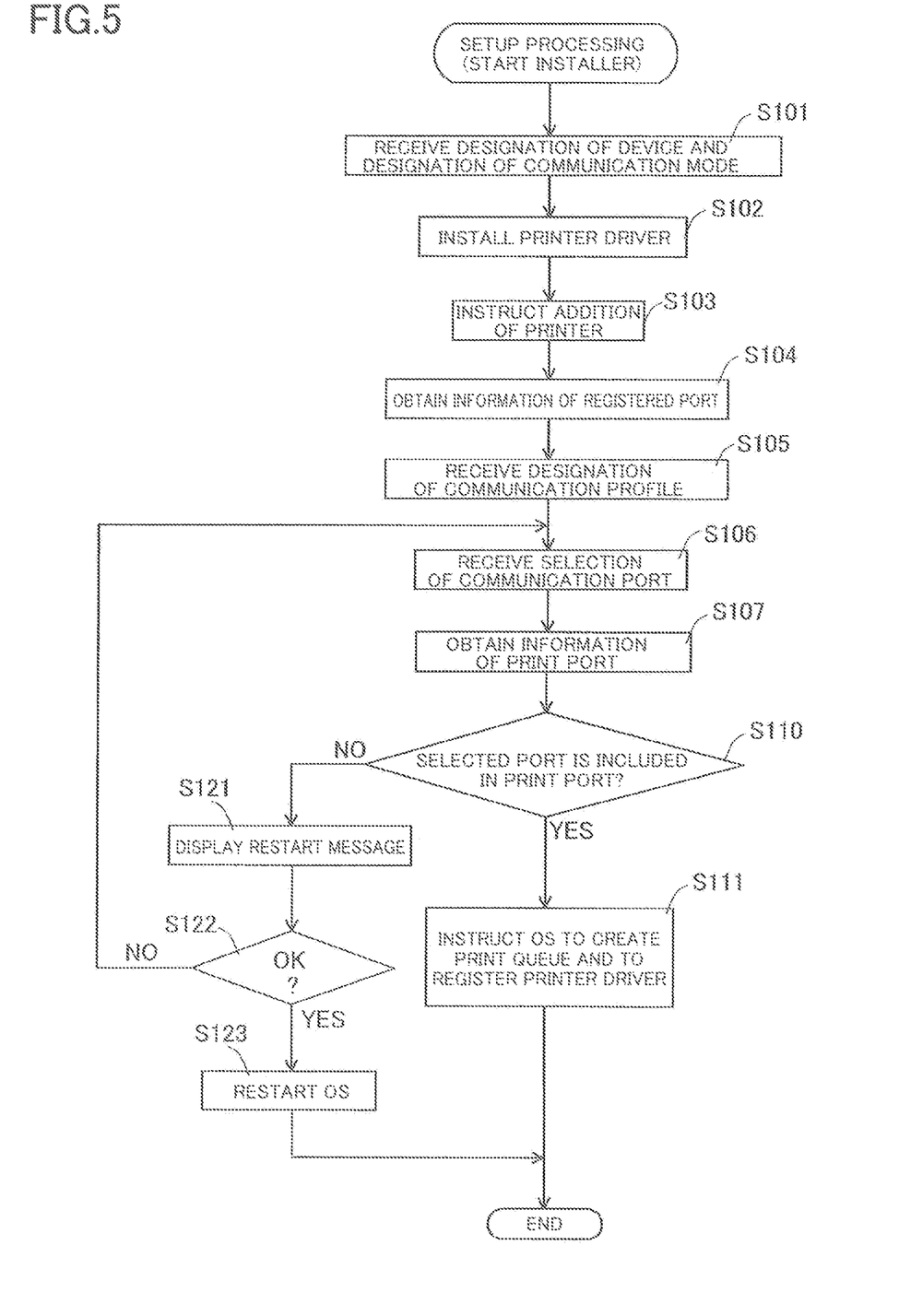
FIG. 5 is a flowchart illustrating a procedure of setup processing according to a first embodiment.

The CPU 11 may also restart the spooler 411 instead of restarting the OS 41 in the setup processing of FIG. 5. In that case, the CPU 11 may display, for example, notification for restarting the spooler 411 and a message for prompting execution of the operation to the OK button 511 not in the middle of printing or in a state in which there is no job to be printed as a message for restart at S121. In this case, when it is determined that the operation to the OK button 511 has been received (S122: YES), the CPU 11 restarts the spooler 411 at S123, then, returns to S106 and continues processing. The print port corresponding to the added communication port is added to the print port list 45 also by restarting the spooler 411.

As described above in detail, when the communication port associated with the printer 2 is the communication port not included in the print port list 45; the installer 42 according to the embodiment is not capable of instructing the OS 41 to create the print queue, therefore, the installer 42 executes processing for registering the communication port in the print port list 45. The installer 42 prompts the restart of the OS 41. Accordingly, the communication port is registered in the print port list 45, therefore, a possibility that the setup of the printer driver 421 necessary for communicating with the printer 2 can be completed is increased.

Figure 7:
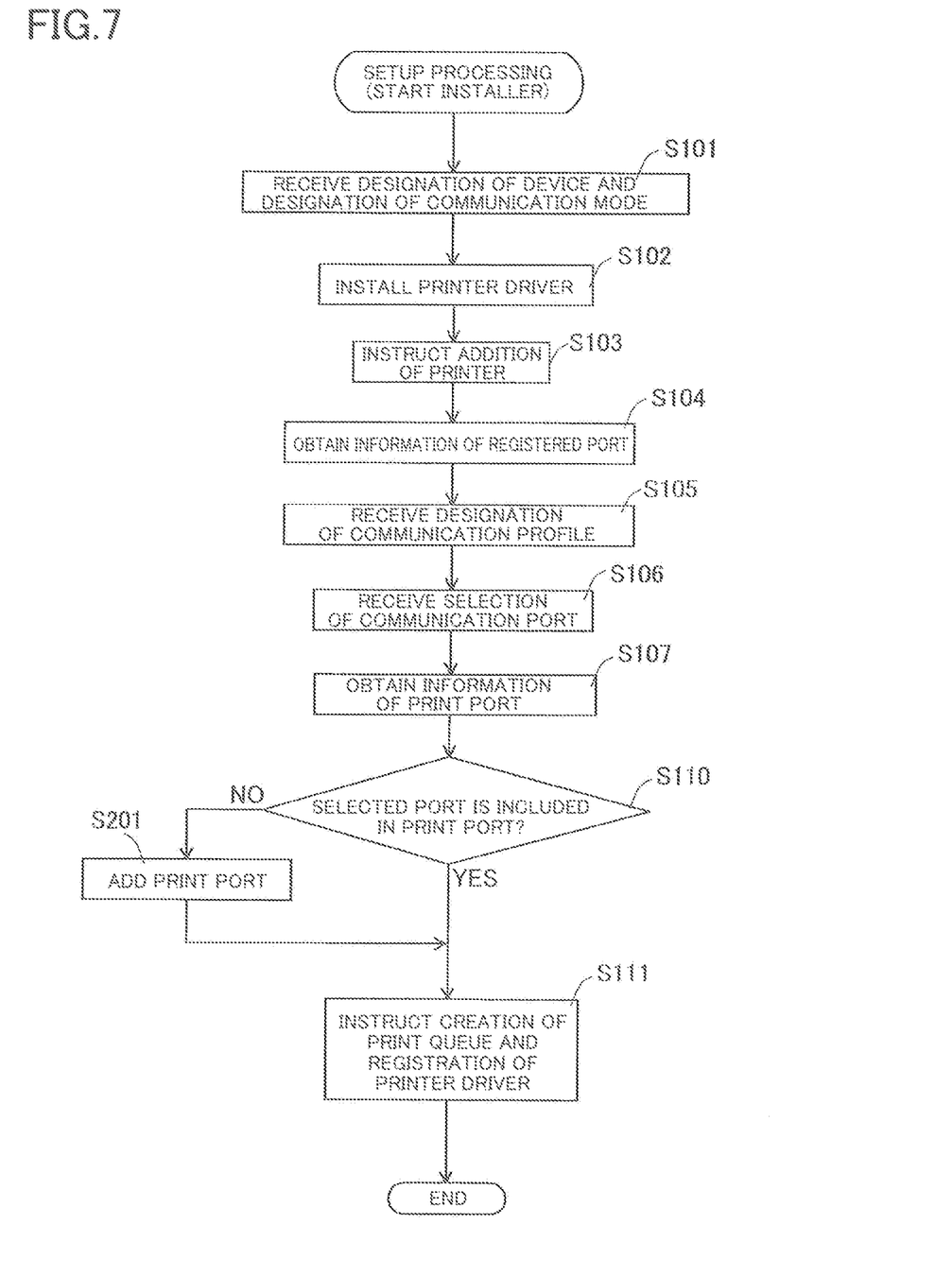
FIG. 7 is a flowchart illustrating a procedure of setup processing according to a second embodiment.

Next, a procedure of setup processing according to a second embodiment will be explained with reference to a flowchart of FIG. 7. The setup processing is executed by the CPU 11 of the PC 1 when the installer 42 is started in the PC 1. The setup processing according to the embodiment differs from the first embodiment in processing executed when it is determined that the print port having the same name as the selected communication port is not included in the print port list 45. The same signs are given to parts common to the setup processing according to the first embodiment, and the explanation will be simplified.

Also in the setup processing according to the second embodiment, the CPU 11 installs the printer driver 421 in accordance with the instruction by the user (S101 to S102), and the CPU 11 causes the OS 41 to execute pairing with the printer 2 (S103). Moreover, the CPU 11 obtains the name of the communication port registered for the printer 2 (S104). The CPU 11 also receives designation of the communication profile to be used (S105) and selection of the communication port (S106) by the user's operation.

Furthermore, the CPU 11 obtains the print port list 45 from the OS 41 (S107) and determines whether the print port with the same name as the selected communication port is included in the print port list 45 or not (S110). When it is determined that the print port with the same name as the selected communication port is included in the print port list 45 (S110: YES), the CPU 11 designates the print port and passes the instruction for creating the print queue and the instruction for registering the installed printer driver 421 so as to be associated with the created print queue to the OS 41 (S111) to end the setup processing.

On the other hand, when it is determined that the print port with the same name as the selected communication port is not included in the print port list 45 (S110: NO), the CPU 11 creates a local port having the same name as the selected communication port and adds the created local port to the print port list 45 (S201). S201 is an example of second setup processing. The CPU 11 may register the port name of the created local port, namely, the selected communication port name in the print port list 45. The CPU 11 may add the local port for the printer 2 in the print port list 45 and combines identification information of the added local port with identification information of the COM port obtained at S104. That is, the CPU 11 adds the local port having the same name as the added COM port to the print port list 45 as one of the print ports.

The local port is a port not having an attribution, and the OS 41 can deal with the local port in the same manner as the COM port as long as the local port is registered in the print port list 45. The created and registered local port is not deleted unless expressly instructed by a user's operation and continued being used in the same manner as a normal print port.

Then, the CPU 11 designates the added local port and instructs the OS 41 to create the print queue and register the printer driver 421 (S111, A13 of FIG. 3), and ends the setup processing.

As described above in detail, the local port for the printer 2 is added to the print port list 45 also by the installer 42 according to the embodiment, therefore, a possibility that the setup of the printer driver 421 necessary for communicating with the printer 2 can be completed is increased. In the embodiment, it is neither necessary to restart the OS 41 nor necessary to restart the installer 42, therefore, the labor of the user is further reduced as compared with the first embodiment. On the other hand, the print port is created by using the function of OS 41 according to the first embodiment, therefore, availability of the processing is high, for example, even when specifications of the OS 41 are changed.

Moreover, the installer 42 according to the first embodiment notifies the restart of the OS 41 or the spooler 411 when the communication port associated with the printer 2 is the communication port not included in the print port list 45. The possibility that the OS 41 or the spooler 411 is restarted is increased by the notification, and the added COM port is added to the print port list 45 when the OS 41 or the spooler 411 is restarted, which increases the possibility that the setup can be completed.

Furthermore, the installer 42 according to the second embodiment adds the local port with the same name as the added communication port registered in the communication port list 44 to the print port list 45. Accordingly, the added local port can be used as the print port even when the OS 41 is not restarted, which increases the possibility that the setup can be completed.

The embodiments are merely examples, and do not limit the present disclosure at all. Therefore, various modifications and alterations may naturally occur in the technique disclosed in the specification within a scope not departing from the gist thereof. For example, the device using the printer driver 421 is not limited to the printer as long as the device has the print function and the communication function, which may be a multifunction device, a copy machine, a FAX machine or the like. Additionally, the numbers of PCs and devices, various data configurations and the like are not limited to illustrated examples.

Moreover, the installer 42 may have both functions of the first embodiment and the second embodiment, or may have any one of functions. The communication mode is not limited to the BT communication. The communication port to be used is not limited to the COM port.

Although the installer 42 for installing the print driver for the printer 2 is cited as an example in the embodiments, a program different from the program for installing the printer driver, which is the program only for executing setup may be used.

In arbitrary flowcharts disclosed in embodiments, a plurality of processing in a plurality of arbitrary steps may be arbitrarily changed in the execution order or may be executed in parallel in a range not causing discrepancy in the processing contents.

The processing disclosed in embodiments may be executed by a single CPU, a plurality of CPUs, hardware such as ASIC or combinations of them. The processing disclosed in the embodiments may be realized in various states such as a recording medium recording programs or methods for executing the processing.

What is claimed is:

1. A non-transitory storage medium storing a plurality of instructions readable by a computer of an information processing apparatus,
    wherein the information processing apparatus comprises a communication interface,
    wherein a plurality of communication ports for communicating with a plurality of devices respectively through the communication interface are set in an operating system of the information processing apparatus, the plurality of communication ports being capable of being associated with the plurality of devices respectively,
    wherein, when executed by the computer, the plurality of instructions cause the information processing apparatus to execute first setup processing of allowing a particular port of the plurality of communication ports to be used by software used for communicating with the particular device through the communication interface, the particular port being associated with the particular device of the plurality of devices, and,
    wherein, when executed by the computer, before the first setup processing is executed, the plurality of instructions cause the information processing apparatus to:
        execute determination processing of determining whether the first setup processing is executable for the particular port or not, and
        when it is determined that the first setup processing is not executable for the particular port in the determination processing, execute second setup processing of setting up the particular port as the communication port for which the first setup processing is executable.

2. The non-transitory storage medium according to claim 1,
    wherein the first setup processing is executed after the software is installed on the information processing apparatus, the first setup processing being processing of creating a device queue for communicating with the particular device by the software, the created device queue being associated with the particular port and managed by a spooler of the operating system, the software being a device driver used for communicating with the particular device.

3. The non-transitory storage medium according to claim 2,
    wherein, when executed by the computer, the plurality of instructions cause the information processing apparatus to:
        in a case where the particular port is a communication port with which the device queue is associated, determine that the first setup processing is executable for the particular port in the determination processing, and
        in a case where that particular port is a communication port with which the device queue is not associated, determine that the first setup processing is not executable for the particular port in the determination processing,
        when it is determined that the first setup processing is executable for the particular port in the determination processing, execute the first setup processing of allowing the particular port to be used by the software, and
        when it is determined that the first setup processing is not executable for the particular port in the determination processing, execute the second setup processing of setting up the particular port as the communication port for which the first setup processing is executable.

4. The non-transitory storage medium according to claim 1,
    wherein, when executed by the computer, the plurality of instructions cause the information processing apparatus to execute adding processing in which the operation system is instructed to add a device, the operating system receiving selection of the particular device in response to receipt of an instruction for adding the device and associating the selected particular device with (i) one of the plurality of communication ports set in the operating system before receiving the instruction for adding the device or (ii) an additional port as a communication port newly added by receiving the instruction for adding the device, and
    wherein, when executed by the computer, the plurality of instructions cause the information processing apparatus to determine, when the particular port is the additional port newly added by the adding processing, that the first setup processing is not executable for the additional port in the determination processing, and execute the second setup processing of setting up the additional port as the communication port for which the first setup processing is executable.

5. The non-transitory storage medium according to claim 1,
wherein, when executed by the computer, the plurality of instructions cause the information processing apparatus to execute adding processing in which the operation system is instructed to add a device, the operating system receiving selection of the particular device in response to receipt of an instruction for adding the device and associating the selected particular device with (i) one of the plurality of communication ports set in the operating system before receiving the instruction for adding the device or (ii) an additional port as a communication port newly added by receiving the instruction for adding the device,
wherein, when executed by the computer, the plurality of instructions cause the information processing apparatus to execute, after the adding processing, obtaining processing of obtaining port information indicating a list of communication ports for which the first setup processing is executable from the operating system, and
wherein, when executed by the computer, the plurality of instructions cause the information processing apparatus to determine, when the particular port is not included in the port information obtained in the obtaining processing, that the first setup processing is not executable for the particular port in the determination processing, and execute the second setup processing of setting up the particular port as the communication port for which the first setup processing is executable.

6. The non-transitory storage medium according to claim 4,
wherein, when executed by the computer, the plurality of instructions cause the information processing apparatus to:
execute selection processing in which a connection mode for communicating with the particular device is selected through a user interface of the information processing apparatus, and
execute the adding processing when the selected connection mode is a connection mode connected based on a prescribed standard in which 1-to-1 wireless connection.

7. The non-transitory storage medium according to claim 1,
wherein, when executed by the computer, the plurality of instructions cause the information processing apparatus to restart the operating system when it is determined that the first setup processing is not executable for the particular port in the determination processing, and
wherein, at the time of starting the operating system, the operating system sets up the particular port as the communication port for which the first setup processing is executable.

8. The non-transitory storage medium according to claim 1,
wherein, when executed by the computer, the plurality of instructions cause the information processing apparatus to notify, when it is determined that the first setup processing is not executable for the particular port in the determination processing, information indicating that it is necessary to restart the operating system through the user interface of the information processing apparatus in the second setup processing, and
wherein, at the time of restarting the operating system, the operating system sets up the particular port as the communication port for which the first setup processing is executable.

9. The non-transitory storage medium according to claim 1,
wherein, when executed by the computer, the plurality of instructions cause the information processing apparatus to restart a spooler of the operating system in the second setup processing when it is determined that the first setup processing is not executable for the particular port in the determination processing, and
wherein, at the time of restarting the operating system, the spooler sets up the particular port as the communication port for which the first setup processing is executable.

10. The non-transitory storage medium according to claim 9,
wherein, when executed by the computer, the plurality of instructions cause the information processing apparatus to execute the first setup processing after restarting the spooler in the second setup processing, and
wherein the first setup processing is processing of creating a device queue for communicating with the particular device by the software, the created device queue being associated with the particular port and managed by the spooler of the operating system, the software being a device driver used for communicating with the particular device.

11. The non-transitory storage medium according to claim 1,
wherein, when executed by the computer, the plurality of instructions cause the information processing apparatus to:
when it is determined, in the determination processing, that the first setup processing is not executable for the particular port in the second setup processing, add a new communication port in a first list, and
combine identification information of the newly-added communication port with particular identification information corresponding to the communication port associated with the particular device, the particular identification information being a part of identification information corresponding to communication ports registered in a second list, and
wherein the operating system includes the first list and the second list, the first list being a list storing communication ports for which the first setup processing is executable, the second list being a list storing the plurality of communication ports set in the operating system, the second list storing an association between a corresponding one of the plurality of communication ports and the device.

12. The non-transitory storage medium according to claim 11,
wherein, when executed by the computer, the plurality of instructions cause the information processing apparatus to execute, after the new communication port is added to the first list in the second setup processing, the first setup processing, and
wherein the first setup processing is processing of creating a device queue for communicating with the particular device by the software, the created device queue being associated with the particular port and managed by the spooler of the operating system, the software being a device driver used for communicating with the particular device.

13. An information processing apparatus comprising:
a communication interface; and
a computer,
wherein a plurality of communication ports for communicating with a plurality of devices respectively through the communication interface are set in an operating system of the information processing apparatus, and the plurality of communication ports are capable of being associated with the plurality of devices respectively,
wherein the computer executes first setup processing of allowing a particular port of the plurality of communication ports to be used by software used for communicating with the particular device through the communication interface, the particular port being associated with the particular device of the plurality of devices,
wherein the computer executes, before the first setup processing is executed, determination processing of determining whether the first setup processing is executable for the particular port or not, and
wherein, when it is determined that the first setup processing is not executable for the particular port in the determination processing, the computer executes second setup processing of setting up the particular port as the communication port for which the first setup processing is executable.

* * * * *